US012777115B2

(12) United States Patent
Dutta Choudhury et al.

(10) Patent No.: US 12,777,115 B2
(45) Date of Patent: Oct. 27, 2026

(54) USER EQUIPMENT INPUTS BASED ON SOUNDS AND/OR VIBRATIONS

(71) Applicant: QUALCOMM Incorporated, San Diego, CA (US)

(72) Inventors: Shubhobrata Dutta Choudhury, New Delhi (IN); Francis Joseph, Thrissur (IN)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 18/146,178

(22) Filed: Dec. 23, 2022

(65) Prior Publication Data

US 2024/0214486 A1 Jun. 27, 2024

(51) Int. Cl.
*H04M 1/72454* (2021.01)

(52) U.S. Cl.
CPC .... *H04M 1/72454* (2021.01); *H04M 2250/12* (2013.01)

(58) Field of Classification Search
CPC ........................ H04M 1/7245; H04M 2250/01
USPC .......................................................... 455/418
See application file for complete search history.

(56) References Cited

U.S. PATENT DOCUMENTS

| | | | | |
|---|---|---|---|---|
| 9,613,262 | B2 | 4/2017 | Holz | |
| 2002/0167862 | A1 | 11/2002 | Tomasi et al. | |
| 2015/0199025 | A1* | 7/2015 | Holz | G06F 3/0425 345/156 |
| 2018/0074694 | A1* | 3/2018 | Lehmann | G06F 3/016 |
| 2022/0350481 | A1 | 11/2022 | Zhai et al. | |

OTHER PUBLICATIONS

International Search Report and Written Opinion—PCT/US2023/078182—ISA/EPO—Feb. 5, 2024.

* cited by examiner

*Primary Examiner* — Jirapon Tulop
(74) *Attorney, Agent, or Firm* — Harrity & Harrity LLP/QUALCOMM Incorporated

(57) ABSTRACT

In some aspects, a user equipment (UE) may obtain, via at least one vibration sensor of the UE, at least one vibration measurement. The at least one vibration measurement may correspond to an input location of a mapped region associated with the UE. The UE may output, based on the at least one vibration measurement, control information configured to cause the UE to perform an operation. Numerous other aspects are described.

30 Claims, 6 Drawing Sheets

USER EQUIPMENT INPUTS BASED ON SOUNDS AND/OR VIBRATIONS

FIELD OF THE DISCLOSURE

Aspects of the present disclosure generally relate to user input technologies and, for example, to user equipment inputs based on sounds and/or vibrations.

BACKGROUND

A user equipment (UE) is a computing device or devices that can be used by a user to perform communications, to consume audio and/or visual content, and/or to perform any number of different computing tasks, among other examples. To facilitate user interaction with a UE, the UE can be equipped with one or more sensors that can be used to detect user interactions with the UE.

SUMMARY

Some aspects described herein relate to a user equipment (UE) for wireless communication. The UE may include a memory and one or more processors coupled to the memory. The one or more processors may be configured to obtain, via at least one vibration sensor of the UE, at least one vibration measurement corresponding to an input location of a mapped region associated with the UE. The one or more processors may be configured to output, based on the at least one vibration measurement, control information configured to cause the UE to perform an operation.

Some aspects described herein relate to a method of wireless communication performed by a UE. The method may include obtaining, via at least one vibration sensor of the UE, at least one vibration measurement corresponding to an input location of a mapped region associated with the UE. The method may include outputting, based on the at least one vibration measurement, control information configured to cause the UE to perform an operation.

Some aspects described herein relate to a non-transitory computer-readable medium that stores a set of instructions for wireless communication by a UE. The set of instructions, when executed by one or more processors of the UE, may cause the UE to obtain, via at least one vibration sensor of the UE, at least one vibration measurement corresponding to an input location of a mapped region associated with the UE. The set of instructions, when executed by one or more processors of the UE, may cause the UE to output, based on the at least one vibration measurement, control information configured to cause the UE to perform an operation.

Some aspects described herein relate to an apparatus for wireless communication. The apparatus may include means for obtaining, via at least one vibration sensor of the apparatus, at least one vibration measurement corresponding to an input location of a mapped region associated with the apparatus. The apparatus may include means for outputting, based on the at least one vibration measurement, control information configured to cause the apparatus to perform an operation.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
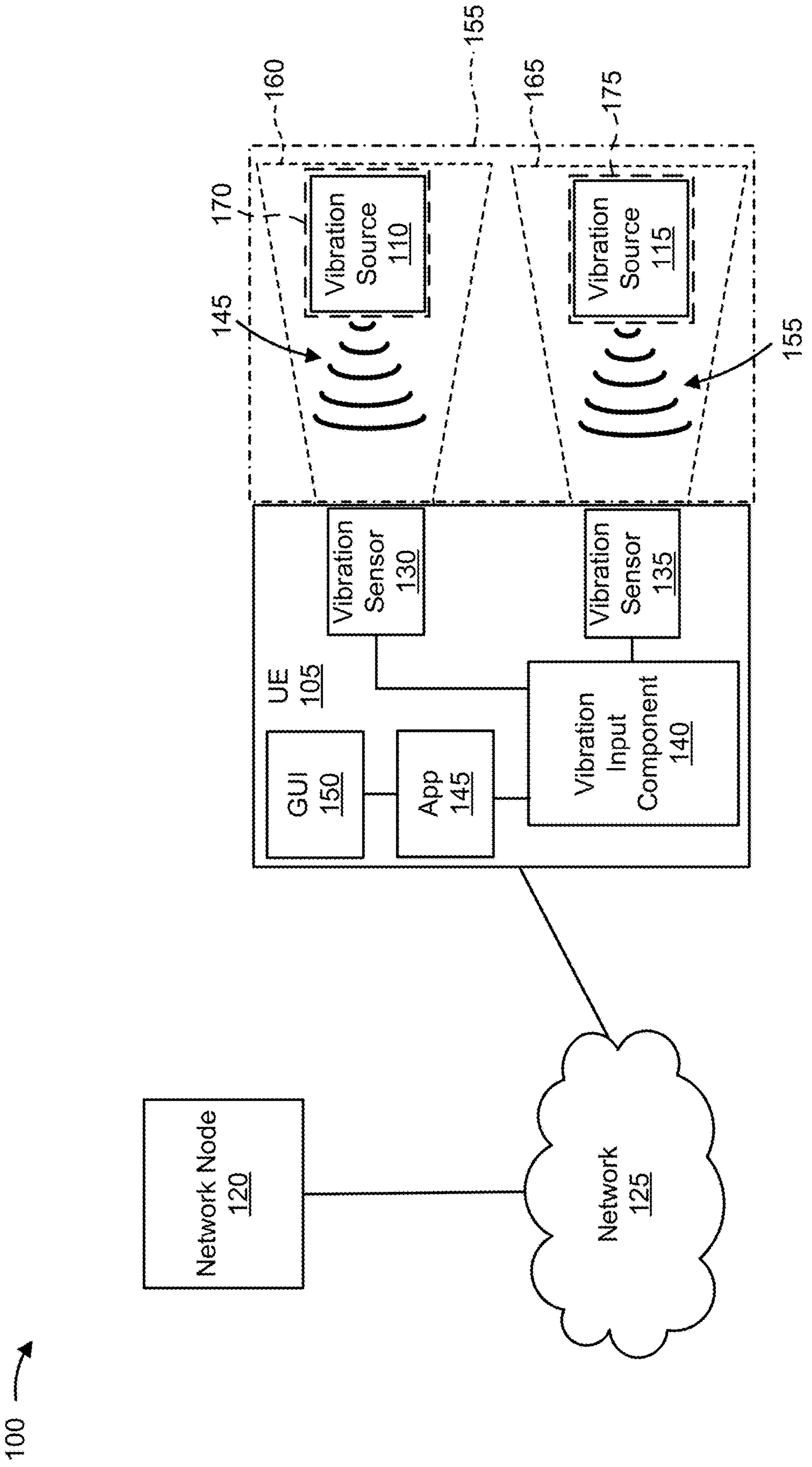
FIG. 1 is a diagram illustrating an example environment in which a user equipment (UE) configured to receive user input based on vibration measurements as described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

User equipment (UE) such as smartphones are becoming a standard part of daily life for many people and often are equipped with large touchscreens. Users interact with the devices using some form of touch action, many of which involve attention to precise touch points on the screen. Sometimes, a user may wish to interact with a UE but has a dirty hand, a wet hand, a gloved hand, or an otherwise occupied hand, which can result in inaccuracy in touch input (e.g., due to ghost touches and/or unrecognized touches) or no touch input at all. Although voice input can mitigate some of these issues, voice commands may not be preferred for small tasks with high repeatability, like skipping tracks, rejecting/accepting calls, and/or changing device modes, among other examples. For example, voice commands can be lengthy and often require an explicit activation message as well.

Some implementations described herein enable the use of vibrations as user input to a UE. A vibration may refer to an oscillation through a solid medium and/or a sound. UEs may be equipped with vibration sensors such as, for example, motion sensors (e.g., high precision gyroscopes, accelerometers, and/or inertial measurement units (IMUs)) and/or sound sensors (e.g., microphones), among other examples. In some implementations, mapped regions around the UE may correspond to respective vibration sensors implemented in a UE. The mapped regions may include spatial areas or spatial volumes adjacent to the UE. The vibration sensors may be used to detect vibrations originating from, or otherwise associated with, the respective mapped regions. Vibration measurements corresponding to input locations of the mapped regions may be used to trigger control information that may be configured to cause the UE to perform an operation in response to a vibration measurement.

For example, in some implementations, a vibration sensor may be used to obtain vibration measurements from which the UE can detect a vibration and determine location information associated with the vibration measurements. Location information may include a distance between a vibration source and the vibration sensor, and/or a position of the vibration source relative to the vibration sensor and/or another vibration source. The vibration measurements may include one or more vibration characteristics such as, for example, a type of a vibration, a quantity of vibrations, a frequency of a vibration, and/or an amplitude of a vibration, among other examples. A vibration input component of the UE may process the vibration measurements and output control information based on the vibration measurements and/or location information. The control information may convert the detected vibrations into a user input such as a selection of a selectable item displayed on a graphical user interface (GUI), a keystroke associated with a keyboard input, movement of a cursor on the GUI, activation of an application or other function such as, for example, accepting or rejecting a phone call, unlocking a lock screen on the UE, switching from one application to another, skipping a music track, and/or adjusting a volume, among other examples.

In this way, aspects disclosed herein may facilitate using vibration as user input to a UE, thereby enabling hands-free user input that may facilitate use of the UE during situations in which a user may otherwise be unable to provide user input (or in which providing user input may be cumbersome). As a result, some aspects may facilitate increased accessibility for UEs to users, having a positive impact on device performance and user experience.

Although some examples are described herein in connection with one or more UEs being used in a cellular-based wireless communication environment, the one or more UEs may similarly be utilized and/or designed for other types of example environments (e.g., wifi environments, short range communication environments (e.g., Bluetooth® environments), roadway vehicle environments, marine environments, and/or aerospace environments, among other examples).

FIG. 1 is a diagram of an example environment 100 in which systems and/or methods described herein may be implemented. As shown in FIG. 1, the environment 100 may include a UE 105, a vibration source 110, and a vibration source 115. The environment 100 also may include a network node 120. The UE 105 and the network node 120 may communicate with one another via a network 125. The UE 105 may be, be integrated with, be implemented in, or include a wireless communication device and/or a network node (such as, or similar to, the network node 120).

The network 125 may be one or more wired networks, one or more wireless networks, or a combination thereof. A wireless network may be or may include elements of a 3G network, a 4G network, a 5G (New Radio (NR)) network, a Long Term Evolution (LTE) network, and/or a 6G network, among other examples.

A network node (e.g., the network node 120) may be a base station (a Node B, a gNB, and/or a 5G node B (NB), among other examples), a UE, a relay device, a network controller, an access point, a transmit receive point (TRP), an apparatus, a device, a computing system, one or more components of any of these, and/or another processing entity configured to perform one or more aspects of the techniques described herein. For example, the network node 120 may be an aggregated base station and/or one or more components of a disaggregated base station.

The UE 105 may be stationary or mobile. The UE 105 may also be referred to as an access terminal, a terminal, a mobile station, a subscriber unit, a station, or the like. The UE 105 may be, include, or be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, an extended reality device, or a satellite radio), a vehicular component or sensor, smart meters/sensors, industrial manufacturing equipment, a global positioning system device, a radar device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). The UE 105 may be included inside a housing that houses components of the UE 105, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, or the like.

As shown, the UE 105 may include a vibration sensor 130 and a vibration sensor 135. In some aspects, the UE 105 may include any number of additional vibration sensors. The vibration sensor 130 and/or 135 may include a sound sensor and/or a motion sensor. A sound sensor (e.g., a microphone) may be configured to detect sound waves (e.g., propagating vibrations), and a motion sensor (e.g., accelerometer, gyroscope, IMU) may be configured to detect vibrations in a solid media. The vibration sensors 130 and 135 may be coupled to a vibration input component 140.

The vibration input component 140 may include the vibration sensors 130 and 135 and/or the vibration sensors 130 and 135 may include the vibration input component. In some aspects, for example, the vibration input component 140 may be hardware, software, and/or a combination thereof, configured to receive vibration measurements from the vibration sensors 130 and 135 and to process the received vibration measurements. For example, the vibration input component 140 may be configured to determine location information associated with a vibration measurement and may generate control information based on the location information. The control information may be provided, for example, to an application 145 (shown as "app"), which may use the control information as user input to control a function of the UE 105. For example, in some aspects, the application 145 may cause the UE 105 to perform an action associated with a GUI 150 based on the control information.

In some aspects, the control information may be based on a location of a vibration source 110 or 115 in association with a mapped region 155 adjacent to the UE 105. In some aspects, the vibration source 110 and/or 115 may be associated with a user. For example, the vibration source may be an interaction, by the user, with an aspect of a physical environment surrounding the UE 105. For example, the vibration source 110 and/or 115 may be a tap, by a user's finger, on a medium (e.g., a table or a counter) on which the UE 105 is placed and/or a sound made by a user's finger or voice, among other examples.

In some aspects, the mapped region 155 may include a spatial area adjacent to the UE 105 and/or a spatial volume adjacent to the UE 105. In some aspects, the mapped region 155 may be adjacent to a portion of the UE 105 (as depicted in FIG. 1) or to the entire UE 105 (e.g., the mapped region may surround the entire UE 105). The mapped region may be based on one or more capabilities of the UE 105. For example, the mapped region may be based on sensitivities of the vibration sensors 130 and 135, complexities of the vibration sensors 130 and 135, and/or software instantiated on the UE 105, among other examples.

As shown, the mapped region 155 may include a set of partitions 160 and 165. The partitions 160 and 165 may be configured in accordance with any number of different shapes and/or sizes. The mapped region 155 may include any number of partitions 160 and 165. In some aspects, the partitions 160 and 165 may be of equal shapes and sizes and, in some other aspects, one or more partitions 160 or 165 may have a different shape and/or size from another partition 160 or 165. Each partition 160 and 165 may correspond to a respective vibration sensor 130 or 135. As shown, for example, the partition 160 may correspond to the vibration sensor 130 and the partition 165 may correspond to the vibration sensor 135. In some aspects, each partition 160 and 165 may correspond to at least one user input. In some aspects, a combination of partitions may correspond to a user input. In some aspects, the partition 160 may include an input location 170, and the partition 165 may include an input location 175. The input location 170 may be a location of the vibration source 110 and the input location 175 may be a location of the vibration source 115. In some aspects, the input location 170 may correspond to a first user input and the input location 175 may correspond to a second user input.

In some aspects, the vibration input component 140 may be configured to enable vibration sensing based on determining an occurrence of a trigger condition. For example, in some aspects, determining the occurrence of the trigger condition may include determining an occurrence of a vibration having one or more defined characteristics. In some aspects, determining the occurrence of the trigger condition may include determining a position of the UE 105 (e.g., determining that the UE 105 is laying on a solid surface and/or positioned on a mount), determining a state of the UE 105 (e.g., a locked state, an activated state, etc.), and/or determining that an application configured to receive vibration-based user input is activated.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
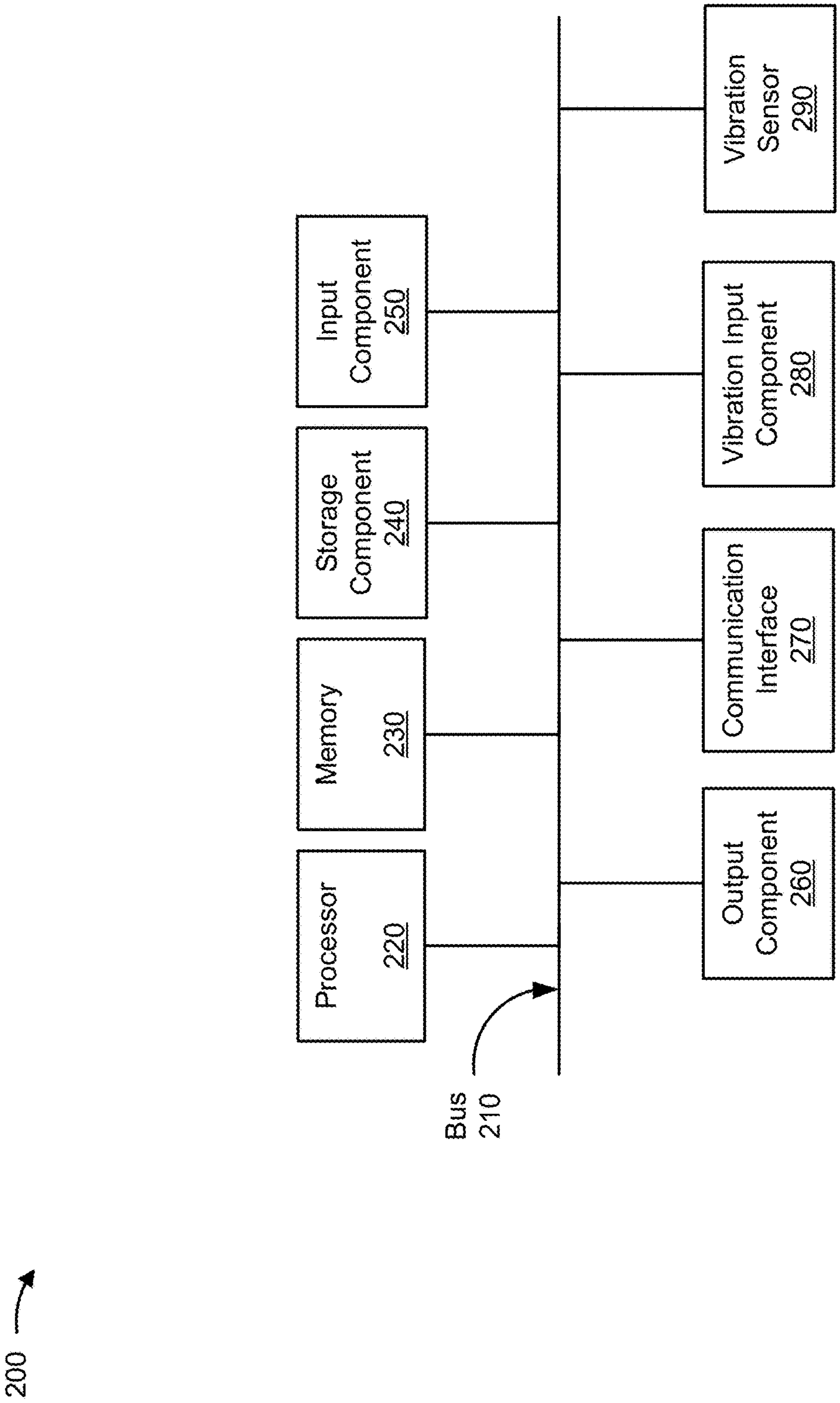
FIG. 2 is a diagram illustrating example components of one or more devices shown in FIG. 1, such as a UE, in accordance with the present disclosure.

FIG. 2 is a diagram illustrating example components of a device 200, in accordance with the present disclosure. Device 200 may correspond to a UE (e.g., the UE 105 depicted in FIG. 1). In some aspects, the UE 105 may include one or more devices 200 and/or one or more components of device 200. The device 200 may facilitate aspects of using vibration measurements as user input, as described below in connection with FIGS. 3-5. As shown in FIG. 2, device 200 may include a bus 210, a processor 220, a memory 230, a storage component 240, an input component 250, an output component 260, a communication interface 270, a vibration input component 280, and/or a vibration sensor 290.

The bus 210 includes a component that permits communication among the components of device 200. The processor 220 may be implemented in hardware, software, or a combination of hardware and software. The processor 220 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, the processor 220 may include one or more processors capable of being programmed to perform one or more functions. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of non-transitory computer-readable medium. The storage component 240 may include a non-transitory computer-readable medium along with a corresponding drive. In some aspects, the storage component 240 may include, be included in, or be integrated with the memory 230.

The input component 250 includes a component that permits the device 200 to receive information, such as via user input (e.g., a touch screen display, a keyboard, a keypad, a mouse, a button, a switch, and/or a microphone). In some aspects, the input component 250 includes the vibration input component 280 and/or the vibration sensor 290. Additionally, or alternatively, the input component 250 may include a component for determining a position or a location of the device 200 (e.g., a global positioning system (GPS) component, a global navigation satellite system (GNSS) component, and/or the like), and/or a sensor for sensing information (e.g., an accelerometer, a gyroscope, an actuator, another type of position or environment sensor, and/or the like), among other examples.

The output component 260 may include a component that provides output information from the device 200 (e.g., a display, a speaker, a haptic feedback component, an audio or visual indicator, and/or the like). In some aspects, the output component 260 may include a transmission chain and/or one or more components thereof, a signal generator, a projection component, and/or one or more components thereof, among other examples.

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like. In some aspects, the communication interface 270 may enable the device 200 to perform an action based at least in part on detecting a target, as described above in connection with FIG. 1.

The vibration input component 280 may include a software component, a hardware component, or a combination thereof, that is configured to perform one or more procedures associated with user input based on vibration measurements, as described herein. The vibration input component 280 may be included in, or include one or more aspects of, the processor 220, the memory 230, the storage component 240, the input component 250, the output component 260, and/or the communication interface 270. The vibration sensor 290 may be a sensing device configured to obtain vibration measurements associated with vibrations in a physical environment adjacent to the device 200.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or storage component 240 from another computer-readable medium or from another device via the communication interface 270. When executed, software instructions stored in the memory 230 and/or the storage component 240 may cause the processor 220 to perform one or more processes described herein. Thus, for example, software instructions may include, be included in, or otherwise contribute to the instantiation and function of a vibration input component (e.g., the vibration input component 280) and/or a vibration sensor (e.g., the vibration sensor 290), among other examples.

Additionally, or alternatively, hardwired circuitry may be used in place of, or in combination with, software instructions to perform one or more processes described herein. Thus, aspects described herein are not limited to any specific combination of hardware circuitry and/or software.

In some aspects, device 200 includes means for performing one or more processes described herein and/or means for performing one or more operations of the processes described herein. For example, device 200 may include means for obtaining at least one vibration measurement corresponding to an input location of a mapped region associated with the device 200, and means for outputting, based on the at least one vibration measurement, control information configured to cause the device 200 to perform an operation. In some aspects, such means may include one or more components of the device 200 described in connection with FIG. 2, such as the bus 210, the processor 220, the memory 230, the storage component 240, the input component 250, the output component 260, the communication interface 270, the vibration input component 280, and/or the vibration sensor 290, among other examples.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
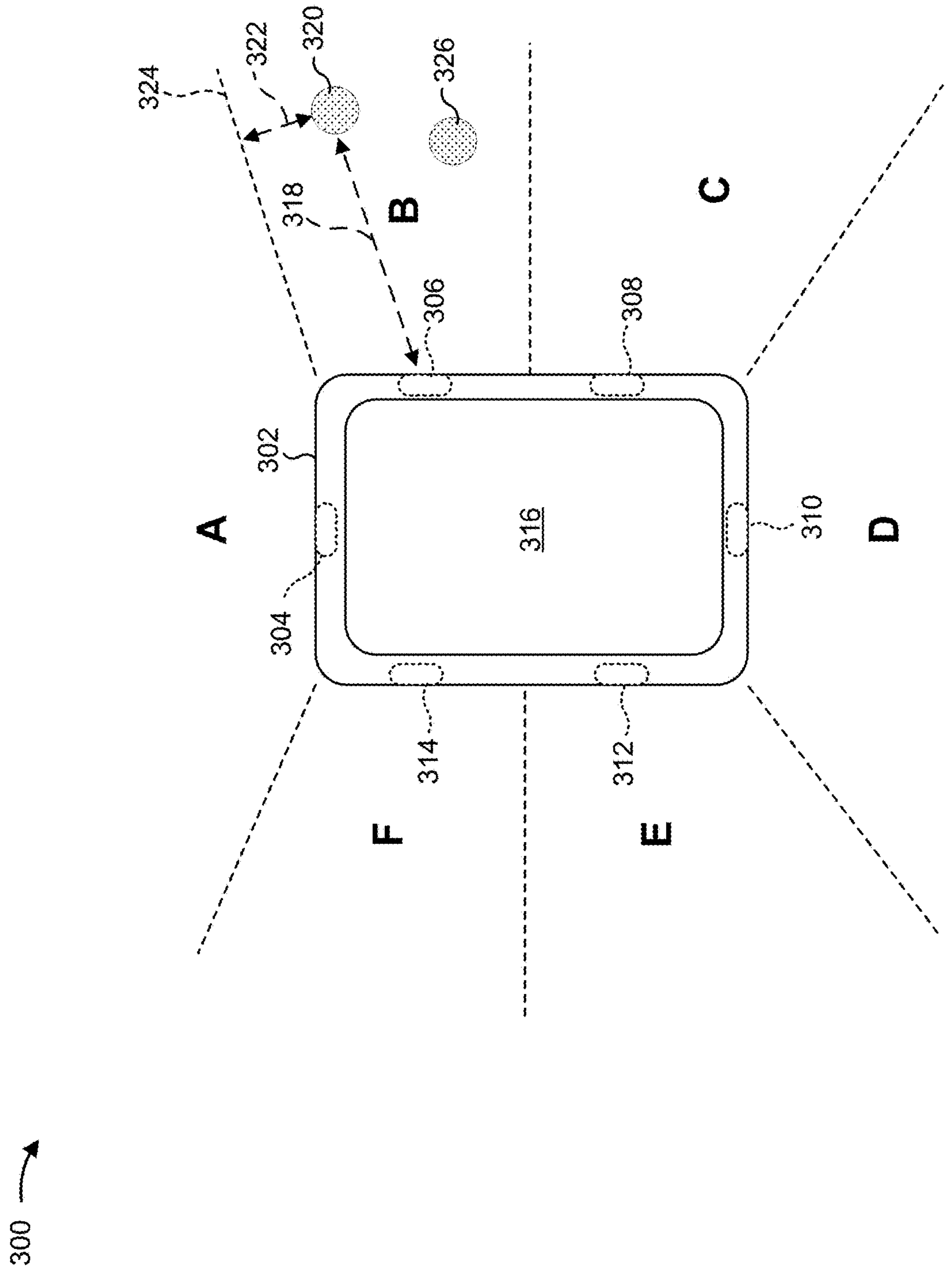
FIGS. 3-5 are diagrams illustrating examples associated with user input based on vibration measurements, in accordance with the present disclosure.

FIG. 3 is a diagram illustrating an example 300 associated with user input based on vibration measurements, in accordance with the present disclosure. As shown, a UE 302 may include a number of vibration sensors 304, 306, 308, 310, 312, and 314. Each vibration sensor may be associated with a respective partition of a mapped region. As shown, for example, the vibration sensor 304 corresponds to a partition A, the vibration sensor 306 corresponds to a partition B, the vibration sensor 308 corresponds to a partition C, the vibration sensor 310 corresponds to a partition D, the vibration sensor 312 corresponds to a partition E, and the vibration sensor 314 corresponds to a partition F.

In some aspects, each partition may correspond to a different user input. for example, a vibration detected in partition A may correspond to a user input for waking the UE 302 to check for notifications on a lock screen displayed on a display device 316 of the UE 302. A vibration detected in partition B may correspond to a user input for scrolling or wiping a page on a GUI, a vibration detected in partition C may correspond to a user input for starting an audio note, a vibration detected in partition D may correspond to a user input to a select button, a vibration detected in partition E may correspond to a user input to a back button, and/or a vibration detected in partition F may correspond to a user input to an application instantiated on the UE 302. Any number of different and/or additional user inputs may be associated with any of the partitions A-F and/or additional partitions.

In some aspects, combinations of partitions may correspond to defined user inputs. For example, vibrations detected simultaneously (or within a defined time threshold) in partitions B and C may correspond to a user input for scrolling down, vibrations detected in partitions B and A may correspond to a user input for scrolling up, vibrations detected in partitions B and F may correspond to a user input for swiping left, and/or vibrations detected in partitions B and E may correspond to a user input for swiping right. Any number of different and/or additional user inputs may be associated with any number of combinations of the partitions A-F and/or additional partitions.

In some aspects, a trigger condition may be defined for activating the vibration-based user input. For example, the UE 302 may activate user input based on vibration measurements based on determining an occurrence of a clap and/or a tap on the surface on which the UE 302 is placed. Any number of other trigger conditions may be associated with activating the capability for user input based on vibration measurements.

In some aspects, the UE 302 may determine location information associated with obtained vibration measurements. The location information may indicate at least one of a distance 318 between an input location 320 corresponding to a vibration source and the associated vibration sensor 306 or a position relative to the vibration sensor 306. For example, the location information may indicate a distance 322 between the input location 320 and a partition border 324. The location information may correspond to any number of different types of coordinate systems including, for example, cartesian coordinate systems and/or polar coordinate systems. In some aspects, a vibration originating from the input location 320 may correspond to a first user input, while a vibration originating from an input location 326 may correspond to a second user input.

The number and arrangement of components and/or other aspects shown in FIG. 3 are provided as an example. In practice, the UE 302 may include additional components and/or functionalities, fewer components and/or functionalities, different components and/or functionalities, or differently arranged components and/or functionalities than those shown in FIG. 3. Additionally, or alternatively, a set of components (e.g., one or more components) of the UE 302 may perform one or more functions described as being performed by another set of components of the UE 302.

Figure 4:
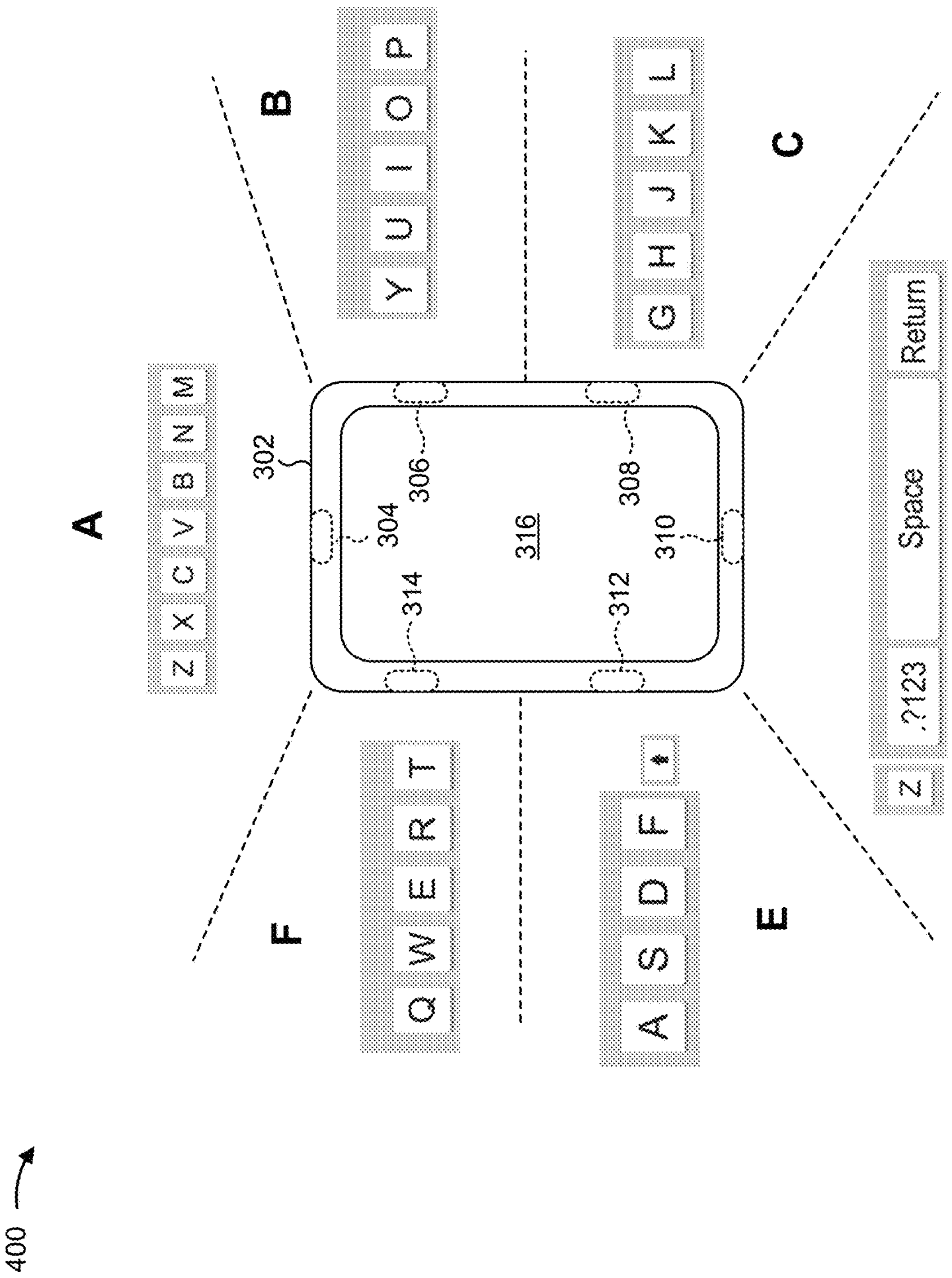

FIG. 4 is a diagram illustrating an example 400 associated with user input based on vibration measurements, in accordance with the present disclosure. Example 400 depicts an example in which input locations of the partitions associated with the UE 302 depicted in FIG. 3 correspond to keyboard inputs (e.g., keystrokes).

In some aspects, vibration characteristics may be used to facilitate additional user inputs. For example, quick taps in succession may correspond to different user inputs than slower taps (e.g., taps that occur at longer time intervals). For example, a combination of taps in succession (within a defined time interval) may correspond to a single keystroke. In some cases, for example, a first tap may select the partition and a second tap may select the letter based on a count of letter positions from one side of the layout associated with the partition. For example, tapping within partition B twice may result in a keypress of "Y" while tapping three times may result in a keypress of "U." The keyboard configuration depicted in FIG. 4 is presented as an example and any number of additional keyboard layouts may be implemented. In some aspects, keyboard layouts may be defined based on applications and/or user input.

The number and arrangement of components and/or other aspects shown in FIG. 4 are provided as an example. In practice, the UE 302 may include additional components and/or functionalities, fewer components and/or functionalities, different components and/or functionalities, or differently arranged components and/or functionalities than those shown in FIG. 4. Additionally, or alternatively, a set of components (e.g., one or more components) of the UE 302 may perform one or more functions described as being performed by another set of components of the UE 302.

Figure 5:
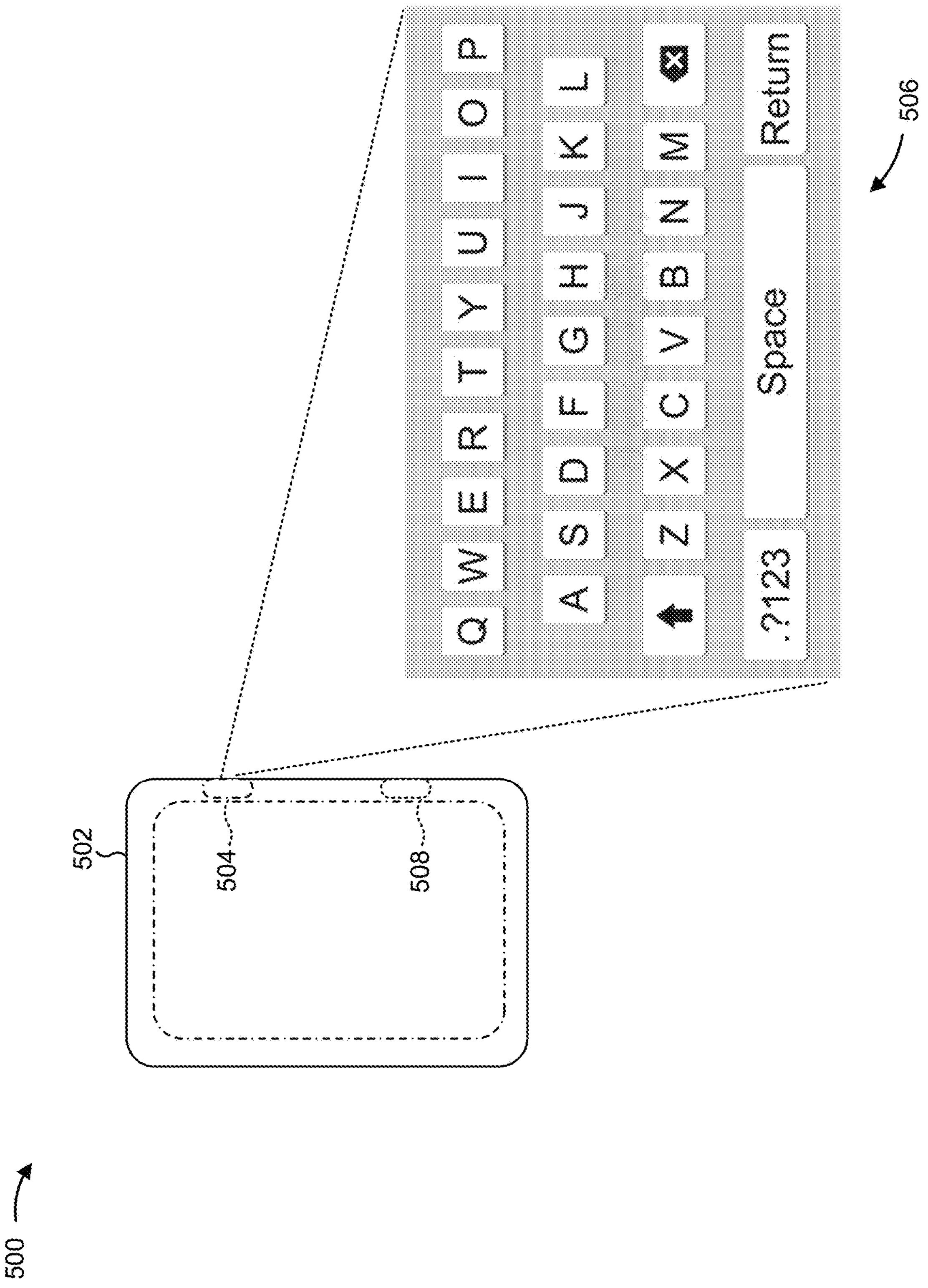

FIG. 5 is a diagram illustrating an example 500 associated with user input based on vibration measurements, in accordance with the present disclosure. Example 500 depicts an example in which input locations associated with a UE 502 correspond to keyboard inputs (e.g., keystrokes). In the illustrated example, the mapped region may include one partition with input locations corresponding to respective keys. In some aspects, for example, the UE 502 may include a projection component 504 configured to project an image 506 of a keyboard onto a surface. The image 506 may be projected such that one or more vibration sensors 508 may obtain vibration measurements associated with the input locations corresponding to the respective keys of the keyboard.

The number and arrangement of components and/or other aspects shown in FIG. 5 are provided as an example. In practice, the UE 502 may include additional components and/or functionalities, fewer components and/or functionalities, different components and/or functionalities, or differently arranged components and/or functionalities than those shown in FIG. 5. Additionally, or alternatively, a set of components (e.g., one or more components) of the UE 502 may perform one or more functions described as being performed by another set of components of the UE 502.

Figure 6:
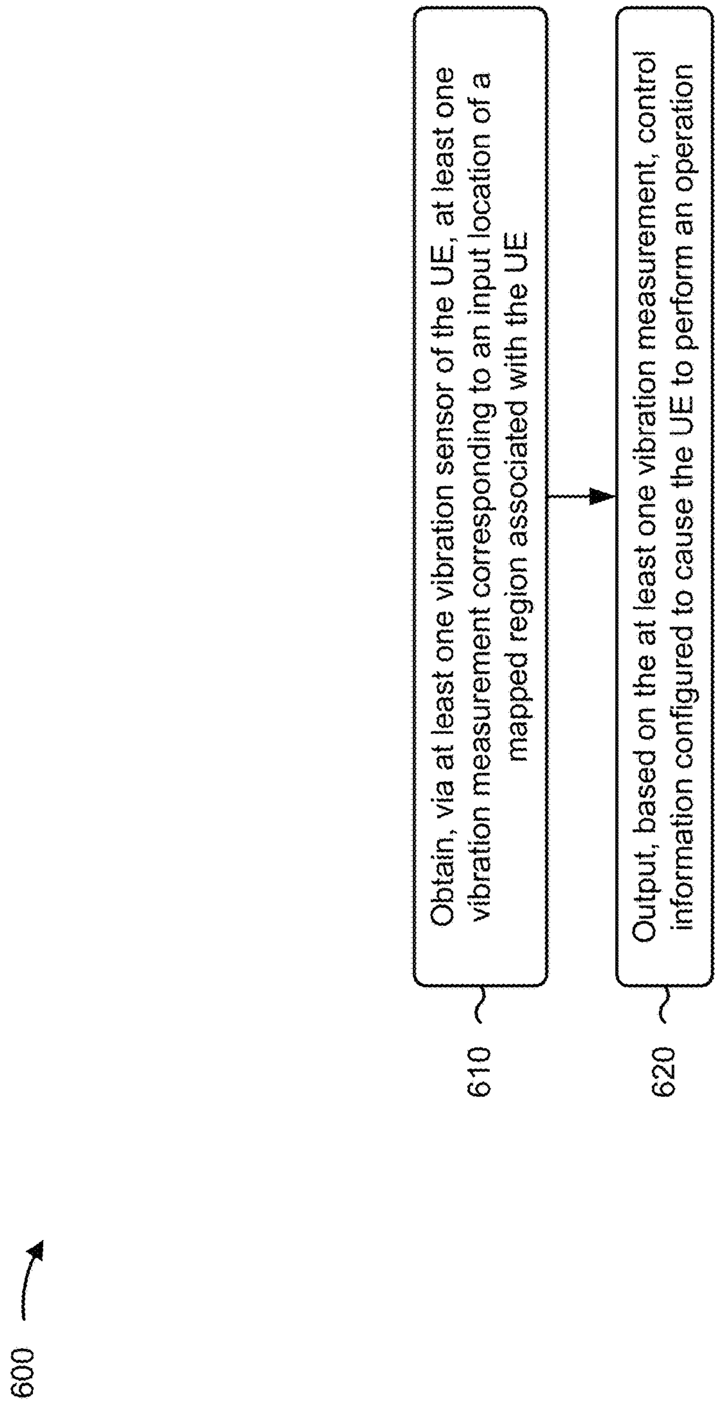
FIG. 6 is a flowchart of an example process associated with user input based on vibration measurements, in accordance with the present disclosure.

FIG. 6 is a diagram illustrating an example process 600 performed, for example, by a UE, in accordance with the present disclosure. Example process 600 is an example where the UE (e.g., UE 105) performs operations associated with user input based on vibration measurements.

As shown in FIG. 6, in some aspects, process 600 may include obtaining, via at least one vibration sensor of the UE, at least one vibration measurement corresponding to an input location of a mapped region associated with the UE (block 610). For example, the UE (e.g., using the vibration input component 280 and/or the vibration sensor 290, depicted in FIG. 2) may obtain, via at least one vibration sensor of the UE, at least one vibration measurement corresponding to an input location of a mapped region associated with the UE, as described above.

As further shown in FIG. 6, in some aspects, process 600 may include outputting, based on the at least one vibration measurement, control information configured to cause the UE to perform an operation (block 620). For example, the UE (e.g., using the vibration input component 280, the processor 220, and/or the output component 260, depicted in FIG. 2) may output, based on the at least one vibration measurement, control information configured to cause the UE to perform an operation, as described above.

Process 600 may include additional aspects, such as any single aspect or any combination of aspects described below and/or in connection with one or more other processes described elsewhere herein.

In a first aspect, the at least one vibration sensor comprises at least one of a sound sensor or a motion sensor. In a second aspect, alone or in combination with the first aspect, process 600 includes determining location information associated with the at least one vibration measurement, wherein the control information is based on the location information. In a third aspect, alone or in combination with the second aspect, the location information indicates at least one of a distance from the at least one vibration sensor or a position relative to the at least one vibration sensor.

In a fourth aspect, alone or in combination with one or more of the first through third aspects, the at least one vibration measurement indicates at least one vibration characteristic, and the control information is based on the at least one vibration characteristic. In a fifth aspect, alone or in combination with the fourth aspect, the at least one vibration characteristic comprises at least one of a type of a vibration, a quantity of vibrations, a frequency of a vibration, or an amplitude of a vibration.

In a sixth aspect, alone or in combination with one or more of the first through fifth aspects, the mapped region comprises at least one of a spatial area adjacent to the UE or a spatial volume adjacent to the UE. In a seventh aspect, alone or in combination with the sixth aspect, the mapped region comprises a set of partitions. In an eighth aspect, alone or in combination with the seventh aspect, each partition of the set of partitions corresponds to a respective vibration sensor of the at least one vibration sensor. In a ninth aspect, alone or in combination with one or more of the seventh or eighth aspects, each partition of the set of partitions corresponds to a respective combination of vibration sensors of the at least one vibration sensor.

In a tenth aspect, alone or in combination with one or more of the seventh through ninth aspects, each partition of the set of partitions corresponds to at least one user input, and outputting the control information comprises providing the at least one user input to a component of the UE configured to perform the operation. In an eleventh aspect, alone or in combination with the tenth aspect, a combination of at least two partitions of the set of partitions corresponds to a user input of the at least one user input. In a twelfth aspect, alone or in combination with one or more of the tenth or eleventh aspects, a first partition corresponds to a first user input of the at least one user input and a second partition corresponds to a second user input of the at least one user input. In a thirteenth aspect, alone or in combination with one or more of the tenth through twelfth aspects, a partition of the set of partitions includes a first input location corresponding to a first user input of the at least one user input and a second input location corresponding to a second user input of the at least one user input. In a fourteenth aspect, alone or in combination with one or more of the tenth through thirteenth aspects, the at least one user input corresponds to at least one of a device command, a graphical user interface input, or a keyboard keystroke.

In a fifteenth aspect, alone or in combination with one or more of the first through fourteenth aspects, process 600 includes determining an occurrence of a trigger condition, wherein obtaining the at least one vibration measurement comprises obtaining the at least one vibration measurement based on determining the occurrence of the trigger condition. In a sixteenth aspect, alone or in combination with one or more of the first through fifteenth aspects, the mapped region is based on one or more capabilities of the UE associated with the at least one vibration measurement. In a seventeenth aspect, alone or in combination with one or more of the first through sixteenth aspects, the UE comprises an extended reality device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: obtaining, via at least one vibration sensor of the UE, at least one vibration measurement corresponding to an input location of a mapped region associated with the UE; and outputting, based on the at least one vibration measurement, control information configured to cause the UE to perform an operation.

Aspect 2: The method of Aspect 1, wherein the at least one vibration sensor comprises at least one of a sound sensor or a motion sensor.

Aspect 3: The method of either of Aspects 1 or 2, further comprising determining location information associated with the at least one vibration measurement, wherein the control information is based on the location information.

Aspect 4: The method of Aspect 3, wherein the location information indicates at least one of a distance from the at least one vibration sensor or a position relative to the at least one vibration sensor.

Aspect 5: The method of any of Aspects 1-4, wherein the at least one vibration measurement indicates at least one vibration characteristic, and wherein the control information is based on the at least one vibration characteristic.

Aspect 6: The method of Aspect 5, wherein the at least one vibration characteristic comprises at least one of a type of a vibration, a quantity of vibrations, a frequency of a vibration, or an amplitude of a vibration.

Aspect 7: The method of any of Aspects 1-6, wherein the mapped region comprises at least one of a spatial area adjacent to the UE or a spatial volume adjacent to the UE.

Aspect 8: The method of Aspect 7, wherein the mapped region comprises a set of partitions.

Aspect 9: The method of Aspect 8, wherein each partition of the set of partitions corresponds to a respective vibration sensor of the at least one vibration sensor.

Aspect 10: The method of either of Aspects 8 or 9, wherein each partition of the set of partitions corresponds to a respective combination of vibration sensors of the at least one vibration sensor.

Aspect 11: The method of any of Aspects 8-10, wherein each partition of the set of partitions corresponds to at least one user input, and wherein outputting the control information comprises providing the at least one user input to a component of the UE configured to perform the operation.

Aspect 12: The method of Aspect 11, wherein a combination of at least two partitions of the set of partitions corresponds to a user input of the at least one user input.

Aspect 13: The method of either of claim 11 or 12, wherein a first partition corresponds to a first user input of the at least one user input and a second partition corresponds to a second user input of the at least one user input.

Aspect 14: The method of any of Aspects 11-13, wherein a partition of the set of partitions includes a first input location corresponding to a first user input of the at least one user input and a second input location corresponding to a second user input of the at least one user input.

Aspect 15: The method of any of Aspects 11-14, wherein the at least one user input corresponds to at least one of a device command, a graphical user interface input, or a keyboard keystroke.

Aspect 16: The method of any of Aspects 1-15, further comprising determining an occurrence of a trigger condition, wherein obtaining the at least one vibration measurement comprises obtaining the at least one vibration measurement based on determining the occurrence of the trigger condition.

Aspect 17: The method of any of Aspects 1-16, wherein the mapped region is based on one or more capabilities of the UE associated with the at least one vibration measurement.

Aspect 18: The method of any of Aspects 1-17, wherein the UE comprises an extended reality device.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors coupled to the memory and configured to cause the UE to:

determine an occurrence of a trigger condition;

obtain, via at least one vibration sensor of the UE and based on determining the occurrence of the trigger condition, at least one vibration measurement corresponding to an input location of a mapped region associated with the UE, the at least one vibration measurement indicating at least one vibration characteristic, wherein the mapped region comprises at least one of a spatial area adjacent to the UE or a spatial volume adjacent to the UE, and wherein the mapped region is based on a sensitivity of the at least one vibration sensor; and output, based on the at least one vibration characteristic, control information configured to cause the UE to perform an operation.

2. The UE of claim 1, wherein the at least one vibration sensor comprises at least one of a sound sensor or a motion sensor.

3. The UE of claim 1, wherein the one or more processors are further configured to cause the UE to determine location information associated with the at least one vibration measurement, wherein the control information is based on the location information.

4. The UE of claim 3, wherein the location information indicates at least one of a distance from the at least one vibration sensor or a position relative to the at least one vibration sensor.

5. The UE of claim 1, wherein the at least one vibration characteristic comprises at least one of a type of a vibration, a quantity of vibrations, a frequency of a vibration, or an amplitude of a vibration.

6. The UE of claim 1, wherein the at least one vibration sensor comprises a plurality of vibration sensors, and wherein the mapped region includes a set of partitions, wherein each partition of the set of partitions corresponds to one vibration sensor of the plurality of vibration sensors.

7. The UE of claim 1, wherein the at least one vibration sensor comprises a plurality of vibration sensors, and wherein the mapped region includes a set of partitions, wherein each partition of the set of partitions corresponds to a combination of vibration sensors of the plurality of vibration sensors.

8. The UE of claim 1, wherein the mapped region includes a set of partitions, wherein each partition of the set of partitions corresponds to at least one user input, and wherein the one or more processors, to cause the UE to output the control information, are configured to cause the UE to provide the at least one user input to a component of the UE configured to perform the operation.

9. The UE of claim 8, wherein a combination of at least two partitions of the set of partitions corresponds to a user input of the at least one user input.

10. The UE of claim 8, wherein a first partition of the set of partitions corresponds to a first user input of the at least one user input and a second partition of the set of partitions corresponds to a second user input of the at least one user input.

11. The UE of claim 8, wherein a partition of the set of partitions includes a first input location corresponding to a first user input of the at least one user input and a second input location corresponding to a second user input of the at least one user input.

12. The UE of claim 8, wherein the at least one user input corresponds to at least one of a device command, a graphical user interface input, or a keyboard keystroke.

13. The UE of claim 1, wherein the UE comprises an extended reality device.

14. A method of wireless communication performed by a user equipment (UE), comprising:

determining an occurrence of a trigger condition;

obtaining, via at least one vibration sensor of the UE and based on determining the occurrence of the trigger condition, at least one vibration measurement corresponding to an input location of a mapped region associated with the UE, the at least one vibration measurement indicating at least one vibration characteristic, wherein the mapped region comprises at least one of a spatial area adjacent to the UE or a spatial volume adjacent to the UE, and wherein the mapped region is based on a sensitivity of the at least one vibration sensor; and outputting, based on the at least one vibration characteristic, control information configured to cause the UE to perform an operation.

15. The method of claim 14, wherein the at least one vibration sensor comprises at least one of a sound sensor or a motion sensor.

16. The method of claim 14, further comprising determining location information associated with the at least one vibration measurement, wherein the control information is based on the location information.

17. The method of claim 14, wherein the UE comprises an extended reality device.

18. The method of claim 14, wherein determining the occurrence of the trigger condition comprises:

determining that the UE is laying on a solid surface, or determining that an application configured to receive vibration-based input is activated.

19. The method of claim 14, wherein the at least one vibration sensor comprises a plurality of vibration sensors, and wherein the mapped region includes a set of partitions, wherein each partition of the set of partitions corresponds to one vibration sensor of the plurality of vibration sensors.

20. The method of claim 14, wherein the at least one vibration sensor comprises a plurality of vibration sensors, and wherein the mapped region includes a set of partitions, each partition of the set of partitions corresponding to a combination of vibration sensors of plurality of vibration sensors.

21. The method of claim 14, wherein the mapped region includes a set of partitions, and each partition of the set of partitions corresponding to at least one user input, and wherein outputting the control information comprises causing the UE to provide the at least one user input to a component of the UE configured to perform the operation.

22. The method of claim 21, wherein a combination of at least two partitions of the set of partitions corresponds to a user input of the at least one user input.

23. The method of claim 21, wherein a first partition of the set of partitions corresponds to a first user input of the at least one user input and a second partition of the set of partitions corresponds to a second user input of the at least one user input.

24. The method of claim 21, wherein the at least one user input comprises a plurality of user inputs provided in sequence within a defined time interval.

25. The method of claim 21, wherein the component of the UE configured to perform the operation comprises a graphical user interface.

26. A non-transitory computer-readable medium storing a set of instructions for wireless communication, the set of instructions comprising:

one or more instructions that, when executed by one or more processors of a user equipment (UE), cause the UE to:

determine an occurrence of a trigger condition;

obtain, via at least one vibration sensor of the UE and based on determining the occurrence of the trigger condition, at least one vibration measurement corresponding to an input location of a mapped region associated with the UE, the at least one vibration measurement indicating at least one vibration characteristic, wherein the mapped region comprises at least one of a spatial area adjacent to the UE or a spatial volume adjacent to the UE, and wherein the mapped region is based on a sensitivity of the at least one vibration sensor; and output, based on the at least one vibration characteristic, control information configured to cause the UE to perform an operation.

27. The non-transitory computer-readable medium of claim 26, wherein the at least one vibration sensor comprises at least one of a sound sensor or a motion sensor.

28. An apparatus for wireless communication, comprising:

means for determining an occurrence of a trigger condition;

means for obtaining, via at least one vibration sensor of the apparatus and based on determining the occurrence of the trigger condition, at least one vibration measurement corresponding to an input location of a mapped region associated with the apparatus, the at least one vibration measurement indicating at least one vibration characteristic, wherein the mapped region comprises at least one of a spatial area adjacent to the apparatus or a spatial volume adjacent to the apparatus, and wherein the mapped region is based on a sensitivity of the at least one vibration sensor; and means for outputting, based on the at least one vibration characteristic, control information configured to cause the apparatus to perform an operation.

29. The apparatus of claim 28, wherein the at least one vibration sensor comprises at least one of a sound sensor or a motion sensor.

30. The apparatus of claim 28, wherein the at least one vibration measurement comprises a quantity of vibrations within a defined time interval, and wherein the control information is based on the quantity of vibrations.

* * * * *